(12) United States Patent
Roush et al.

(10) Patent No.: US 7,704,026 B2
(45) Date of Patent: Apr. 27, 2010

(54) COMPOSITE PANEL TRAILER SIDEWALL WITH ADDITIONAL LOGISTICS SLOTS

(75) Inventors: Mark Roush, Lafayette, IN (US); DeWayne Williams, West Lafayette, IN (US)

(73) Assignee: Vanguard National Trailer Corp., Monon, IN (US)

( * ) Notice: Subject to any disclaimer, the term of this patent is extended or adjusted under 35 U.S.C. 154(b) by 699 days.

(21) Appl. No.: 11/280,492

(22) Filed: Nov. 16, 2005

(65) Prior Publication Data

US 2007/0110538 A1   May 17, 2007

(51) Int. Cl.
    *B60P 7/08* (2006.01)
(52) U.S. Cl. .................. 410/115; 410/106; 410/108; 410/109; 410/113; 296/186.1; 296/191
(58) Field of Classification Search .......... 410/104, 410/106, 108, 109, 110, 112, 113; 296/181.1, 296/181.3, 186.1, 191, 29; 220/1.5; 52/309.4, 52/794.1
See application file for complete search history.

(56) References Cited

U.S. PATENT DOCUMENTS

| 1,693,750 | A | 12/1928 | Groehn |
| 2,283,574 | A | 5/1942 | Pillsbury |
| 3,075,802 | A | 1/1963 | Lowe |
| 3,103,379 | A | 9/1963 | Stone et al. |
| 3,126,224 | A | 3/1964 | Carte, Jr. et al. |
| 3,223,269 | A | 12/1965 | Williams |
| 3,334,007 | A | 8/1967 | Flagan |
| 3,393,920 | A | 7/1968 | Ehrlich |
| 3,551,963 | A | 1/1971 | Mosher |
| 3,735,448 | A | 5/1973 | Waddington |
| 3,909,497 | A | 9/1975 | Hendry |
| 3,992,839 | A | 11/1976 | La Borde |
| 4,015,876 | A | 4/1977 | Hulverson |
| 4,080,522 | A | 3/1978 | Schimmels |
| 4,222,606 | A | 9/1980 | Brown et al. |
| 4,420,183 | A | 12/1983 | Sherman |
| 4,455,803 | A | 6/1984 | Kornberger |
| 4,455,807 | A | 6/1984 | Ehrlich |
| 4,685,721 | A | 8/1987 | Banerjea |
| 4,714,655 | A | 12/1987 | Bordoloi |
| 4,810,027 | A | 3/1989 | Ehrlich |
| 4,887,747 | A | 12/1989 | Ostrowsky |
| 4,904,017 | A | 2/1990 | Ehrlich |
| 4,940,249 | A | 7/1990 | Abott |
| 4,940,279 | A | 7/1990 | Abbott et al. |
| 4,958,472 | A | 9/1990 | Ehrlich |

(Continued)

FOREIGN PATENT DOCUMENTS

GB           748475        5/1956

(Continued)

*Primary Examiner*—Stephen Gordon
(74) *Attorney, Agent, or Firm*—Dowell Baker, P.C.

(57) ABSTRACT

The improved composite panel trailer sidewall of the present invention provides a recessed groove or a pair of recessed grooves on the interior of the panel that are spaced apart from the edges of the panel. Slots are cut in the composite panel in the recessed groove or between the recessed grooves. An interior vertical support having logistics slots is seated in the recessed groove or grooves to provide additional locations to secure and divide cargo without creating snag points in the interior of the trailer.

13 Claims, 4 Drawing Sheets

U.S. PATENT DOCUMENTS

| | | |
|---|---|---|
| 4,965,117 A | 10/1990 | Lautenschlaeger |
| 5,058,756 A | 10/1991 | Green |
| 5,066,066 A | 11/1991 | Yurgevich et al. |
| 5,112,099 A | 5/1992 | Yurgevich |
| 5,140,913 A | 8/1992 | Takeichi |
| 5,195,800 A | 3/1993 | Stafford et al. |
| 5,209,541 A | 5/1993 | Janotik |
| 5,238,968 A | 8/1993 | Morita |
| 5,295,341 A | 3/1994 | Kajiwara |
| 5,378,758 A | 1/1995 | Amici |
| 5,403,062 A | 4/1995 | Sjostedt |
| 5,439,266 A | 8/1995 | Ehrlich |
| 5,472,290 A | 12/1995 | Hulls |
| 5,489,474 A | 2/1996 | Shinoda |
| 5,509,714 A | 4/1996 | Schmidt |
| 5,584,252 A | 12/1996 | Smith et al. |
| 5,584,527 A | 12/1996 | Sitter |
| 5,664,826 A | 9/1997 | Wilkens |
| 5,700,118 A * | 12/1997 | Bennett et al. .............. 410/113 |
| 5,702,090 A | 12/1997 | Edgman |
| 5,860,693 A | 1/1999 | Ehrlich |
| 5,876,089 A | 3/1999 | Ehrlich |
| 5,934,742 A | 8/1999 | Fenton et al. |
| 5,938,274 A | 8/1999 | Ehrlich |
| 5,992,117 A | 11/1999 | Schmidt |
| 5,997,076 A | 12/1999 | Ehrlich |
| 6,003,932 A | 12/1999 | Banerjea |
| 6,010,020 A | 1/2000 | Abal |
| 6,199,939 B1 | 3/2001 | Ehrlich |
| 6,220,651 B1 | 4/2001 | Ehrlich |
| 6,349,988 B1 | 2/2002 | Foster |
| 6,412,854 B2 | 7/2002 | Ehrlich |
| 6,450,564 B1 | 9/2002 | Sill |
| 6,578,902 B2 | 6/2003 | Sill |
| 6,607,237 B1 | 8/2003 | Graaff |
| 6,626,622 B2 | 9/2003 | Subko |
| 6,712,316 B2 | 3/2004 | Jones |
| 6,742,974 B2 * | 6/2004 | Haire .......................... 410/115 |
| 6,745,470 B2 | 6/2004 | Foster |
| 6,800,680 B2 | 10/2004 | Stark |
| 6,824,341 B2 | 11/2004 | Ehrlich |
| 6,832,808 B1 | 12/2004 | Bennett |
| 6,959,959 B1 | 11/2005 | Roush |
| 6,986,546 B2 | 1/2006 | Ehrlich |
| 7,011,358 B2 | 3/2006 | Graaff |
| 7,014,253 B2 | 3/2006 | Oren |
| 7,069,702 B2 | 7/2006 | Ehrlich |
| 7,134,820 B2 | 11/2006 | Ehrlich |
| 7,152,912 B1 | 12/2006 | Roush |
| 2001/0024055 A1 | 9/2001 | Ehrlich |
| 2002/0109377 A1 | 8/2002 | Ehrlich |
| 2003/0184120 A1 | 10/2003 | Buchholz |
| 2003/0212212 A1 | 11/2003 | Wen |
| 2004/0021039 A1 | 2/2004 | Jones |
| 2004/0104597 A1 | 6/2004 | Jones et al. |
| 2005/0241253 A1 | 11/2005 | Song et al. |
| 2006/0028050 A1 | 2/2006 | Ehrlich |
| 2006/0071507 A1 | 4/2006 | Graadd |
| 2008/0116718 A1 | 5/2008 | Lewallen et al. |
| 2008/0134509 A1 | 6/2008 | Lewallen et al. |

FOREIGN PATENT DOCUMENTS

SU 1627443 2/1991

* cited by examiner

COMPOSITE PANEL TRAILER SIDEWALL WITH ADDITIONAL LOGISTICS SLOTS

FIELD OF THE INVENTION

The present invention relates generally to the sidewall construction for a cargo container, and more particularly to a composite panel trailer sidewall that provides additional logistics slots for securing cargo in the trailer.

BACKGROUND OF THE INVENTION

Designers of cargo containers have long faced many related challenges in the design of container sidewalls. First, the structural integrity of the overall container depends on the rigidity and strength of the sidewalls. Second, the sidewalls are optimally light in weight to reduce the transportation costs for the overall container.

Third, government regulations and industry standards often limit the exterior dimensions of cargo containers. Thus, to maximize the capacity of the container, designers of cargo containers seek to minimize the width of the walls of the container without compromising the structural integrity of the container.

Fourth, because cargo containers are repeatedly loaded and unloaded, the interior walls of the container must be resistant to the repeated impact of vehicles and implements used to load and unload the container, and must also optimally be free of protrusions and snag points that could impede the loading or unloading of the container. Fifth, means for securing and dividing cargo within a container are often desirable, and may be provided by incorporating logistics slots in the sidewalls of the container. Other considerations, including the cost and availability of the sidewall components and the ease of manufacturing the sidewalls, are also important.

Composite panel sidewalls have been used in the construction of over-the-road trailers to address many of these challenges. Composite panels are made of a core plastic material and an outer skin of aluminum or steel. The use of composite panels provides many advantages in the construction of trailers. The metal skin of the panels is resistant to damage when the cargo is loaded and unloaded. Also, because of the strength and rigidity of the composite panels, trailer sidewall thickness can generally be reduced as compared to designs that rely on thick structural posts to provide the essential structural rigidity for the trailer. By decreasing the thickness of the walls, an interior width of at least 101 inches can be obtained without exceeding an exterior width of 102.38 inches, the current maximum exterior width under state and federal regulations.

The composite panels are typically joined at their edges with vertical splicer plates on the inside and outside of the trailer, as shown in U.S. Pat. No. 4,904,017 (FIG. 9) issued to Ehrlich, U.S. Pat. No. 5,860,693 (FIG. 2) issued to Ehrlich and U.S. Pat. No. 6,450,564 (FIG. 3) and U.S. Pat. No. 6,578,902 (FIGS. 4 and 5) issued to Sill. The composite panels may also be joined with posts on the inside and outside of the trailer, as disclosed in the applicants' U.S. patent application Ser. No. 11/210,076 filed Aug. 23, 2005 that issued as U.S. Pat. No. 7,152,912, and incorporated herein by reference. These vertical members are typically provided with logistics slots to provide for securing and dividing cargo within the trailer.

Because composite panels provide high strength and rigidity in the construction of the overall trailer, the use of structural posts can be reduced or eliminated. Although the reduction or elimination of such structural posts is generally desirable to reduce the weight of the trailer, these posts have traditionally provided a location for logistics slots where cargo may be secured. Thus, when structural posts are reduced or eliminated through the use of composite panels, the potential locations for logistics slots are also reduced, decreasing the trailer owner's options for securing and dividing cargo within the trailer.

Because composite panel construction and flexibility in the securing and dividing of cargo within the trailer are both highly desirable, a need exists for a composite panel sidewall construction that provides additional logistics slots other than between the edges of adjoining composite panels. Such logistics slots, however, must not create snag points or protrusions on the interior of the trailer. Snag points or protrusions on the inside of the trailer may cause cargo, pallets and loading vehicles to catch on the interior wall of the trailer as cargo is loaded and unloaded, thus creating the potential for damage to cargo and the trailer sidewall. Therefore, it is desirable for the sidewalls of the trailer to be free of snag points and protrusions.

Accordingly, an object of the present invention is to provide a composite panel sidewall construction for a cargo container that provides additional interior logistics slots in the sidewalls of the container for securing cargo loaded into the container.

Yet another object of the present invention is to provide a cargo container with interior walls free of protrusions and snag points that could impede the loading or unloading of the container.

A further object of the present invention is to provide a cargo container with sidewalls of minimum overall thickness to maximize the capacity of the container.

Finally, an object of the present invention is to provide a cargo container sidewall configuration that is economical to manufacture and refined in appearance.

SUMMARY OF THE INVENTION

The composite panel container sidewall construction of the present invention provides additional interior logistics slots in the sidewalls of the container for securing cargo loaded into the container. These additional interior logistics slots are provided by a vertical support that is seated in the composite panel to avoid creating snag points on the interior of the trailer. The present invention also achieves the benefits of conventional composite panel designs, including the recognized benefit of thin container sidewalls that provide an overall interior trailer width of at least 101 inches.

The composite panels of the present invention are embossed on the interior of the panel to create a recessed groove or grooves parallel to the vertical edges of the panel, but inset from the edges of the panel. Slots or holes are also cut in the composite panel in the recessed groove or between the recessed grooves. An interior vertical support having logistics slots is seated in the recessed groove or grooves. The slots in the vertical support align with the slots in the panel and are covered on the exterior of the trailer by an exterior vertical support without slots or holes that is secured to the interior vertical support through the composite panel.

The vertical support may be a vertical post having a midsection and two lateral wings offset from the midsection. In this embodiment, the lateral wings of the post are seated in two parallel recessed grooves with the slots in the post aligned with the slots in the panel. Alternatively, the vertical support may be a vertical plate seated in a single recessed groove with the slots in the plate aligned with the slots in the panel. In either embodiment, the vertical plate or post is substantially recessed in the panel so as to avoid creating snag points in the interior of the trailer while providing additional logistics slots for securing cargo within the trailer.

DETAILED DESCRIPTION

The present invention may be used with any type of transportable cargo container and is particularly suited for applications requiring a large, lightweight container that is regularly loaded and unloaded by utility vehicles. The improved sidewall construction of the present invention may be used with containers transported by road, rail, sea or air. However, for descriptive purposes, the present invention will be described in use with an over-the-road trailer.

Figure 1:
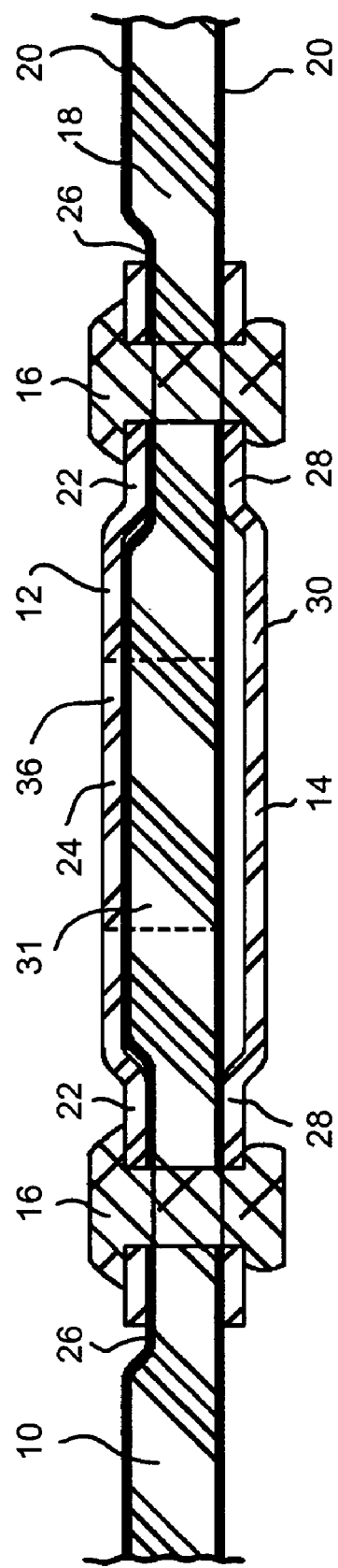
FIG. 1 is a magnified cross-sectional view of a composite panel sidewall with a vertical post seated in two parallel recessed grooves in the composite panel.
Figure 2:
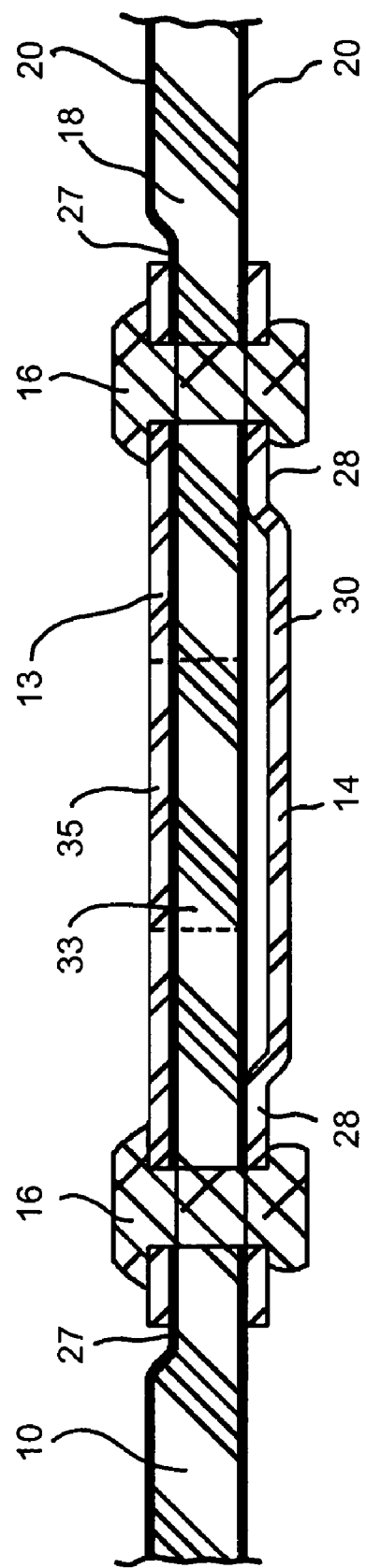
FIG. 2 is a magnified cross-sectional view of a composite panel sidewall with a vertical plate seated in a recessed groove in the composite panel.

FIGS. 1 and 2 show a magnified cross-sectional view of the composite panel sidewall of the present invention including composite panel 10, an interior vertical support, and an exterior post 14. The interior vertical support may be an interior post 12 (shown in FIG. 1) or an interior plate 13 (shown in FIG. 2). The vertical support is secured to the composite panel 10 with rivets 16. The composite panel 10 is comprised of a plastic inner core 18 and outer skins 20. The outer skins 20 are preferably aluminum or steel, although other metals may also be used to create the composite panels. Although composite panels are preferable due to their high strength to weight ratio, solid panels may also be used and would be within the scope of the present invention.

Referring to FIG. 1, the interior post 12 is comprised of two lateral wings 22 offset from a midsection 24. The lateral wings 22 of the interior post 12 seat in the recessed grooves 26. The exterior post 14 is also comprised of two lateral wings 28 offset from a midsection 30. The exterior post 14, however, may be replaced with a flat plate (not shown) and remain within the spirit and scope of the present invention. The exterior post 14 seats against and is riveted to the exterior side of the panel 10. As will be described more fully below, a post logistics slot 36 is cut through the midsection 24 of the interior post 12 and a panel logistics slot 31 is cut through the composite panel 10 to allow for a logistics post to be attached to the interior of the trailer sidewall.

Referring to FIG. 2, the interior post 12 may be replaced with an interior plate 13 seated in a single recessed groove 27 with a plate logistics slot 35 cut through the interior plate 13 and a panel logistics slot 33 cut through the composite panel 10. As used herein, a post is defined as an extended member with a non-linear cross section. A plate, by comparison, is an extended member with a linear cross section. The non-linear cross section of a post provides increased rigidity as compared to a plate of equivalent weight made of the same material. In addition, as shown in FIG. 1, an interior post 12 rather than an interior plate 13 allows a logistics slot 31 of greater depth to be created. The increased depth of the logistics slot 31 allows for greater support and increased attachment options at the logistics slot.

Figure 3:
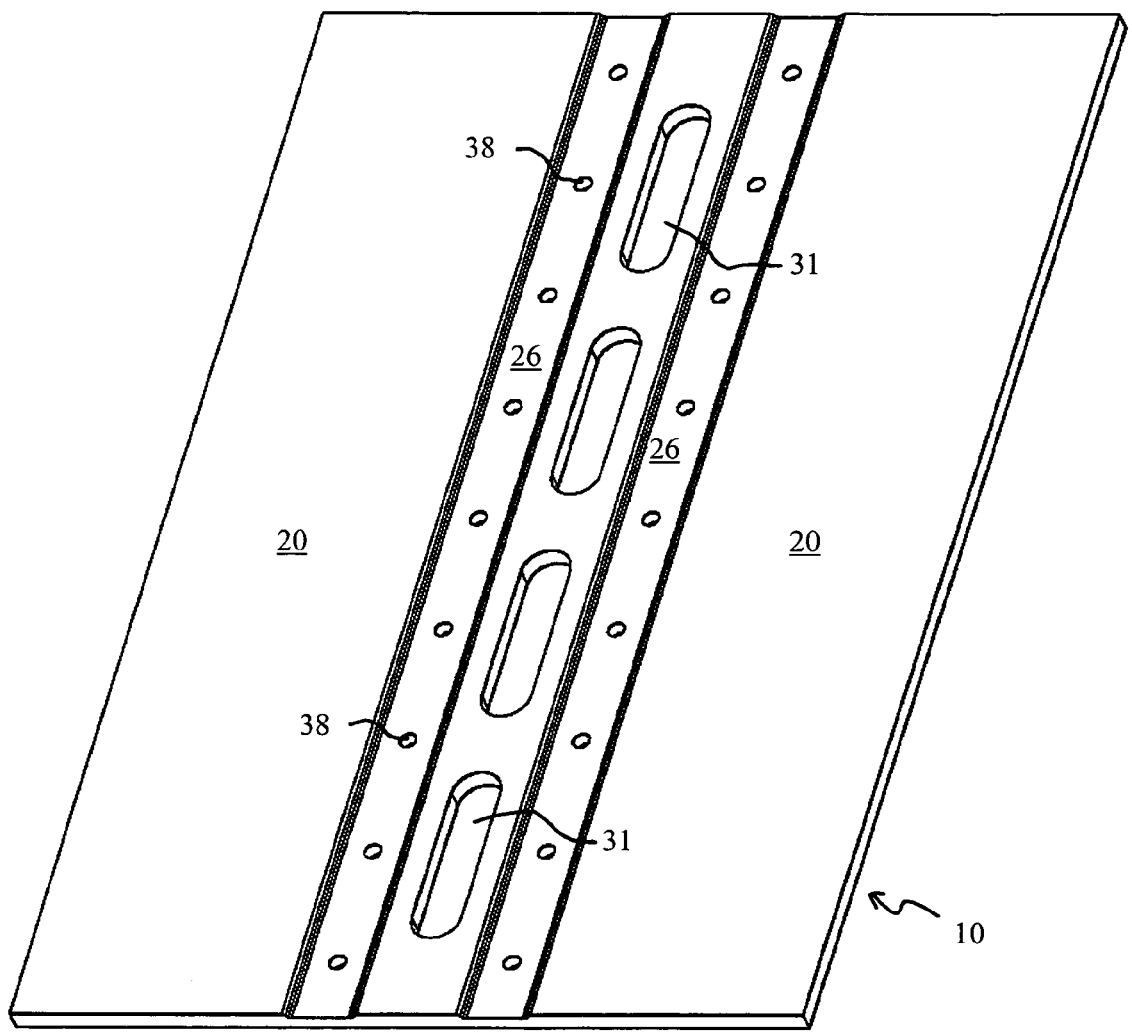
FIG. 3 is a perspective view of a portion of a composite panel with two recessed grooves and logistics slots.

A composite panel 10 having parallel recessed grooves 26 suitable for reception of the described interior post 12 is shown in FIG. 3. The recessed grooves 26 are preferably created by embossing a flat composite panel, although alternative manufacturing methods are well known and would be within the scope of the present invention. For example, the recessed grooves of the present invention could be created with preformed metal skins placed over and attached to a preformed or foamed core of plastic or other material. Alternatively, a solid panel material such as aluminum could be used with the groove milled out of the solid panel.

The recessed grooves 26 include holes 38 in the panel 10 for the insertion of rivets through and attachment of posts to the panel. The panel also includes panel logistics slots 31 cut through the panel 10. As used herein, the terms "slots" and "logistics slots" may mean an aperture or hole of any shape created by any known manufacturing means.

Figure 4:
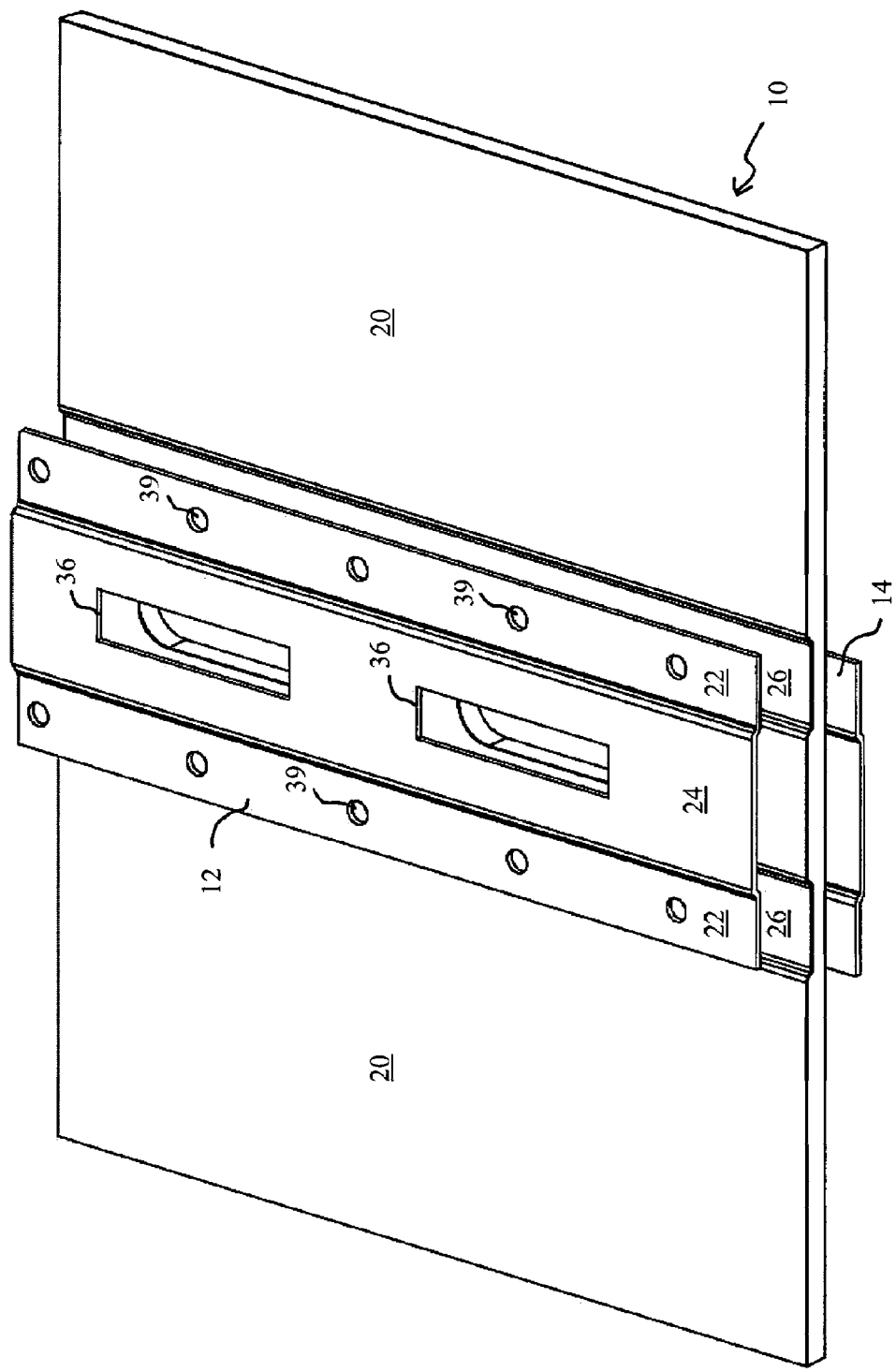
FIG. 4 is an exploded perspective view of a portion of a composite panel sidewall with an interior and exterior post.
Figure 5:
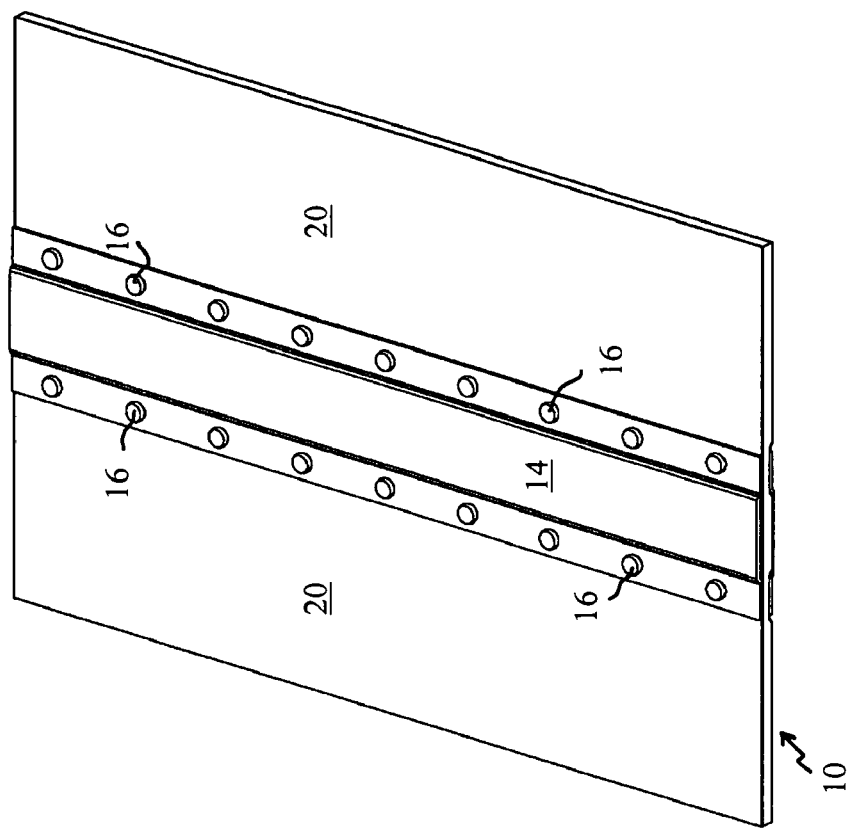
FIG. 5 is a perspective view of a portion of a composite panel sidewall with the additional logistics slots of the present invention viewed from the interior of the container.
Figure 6:
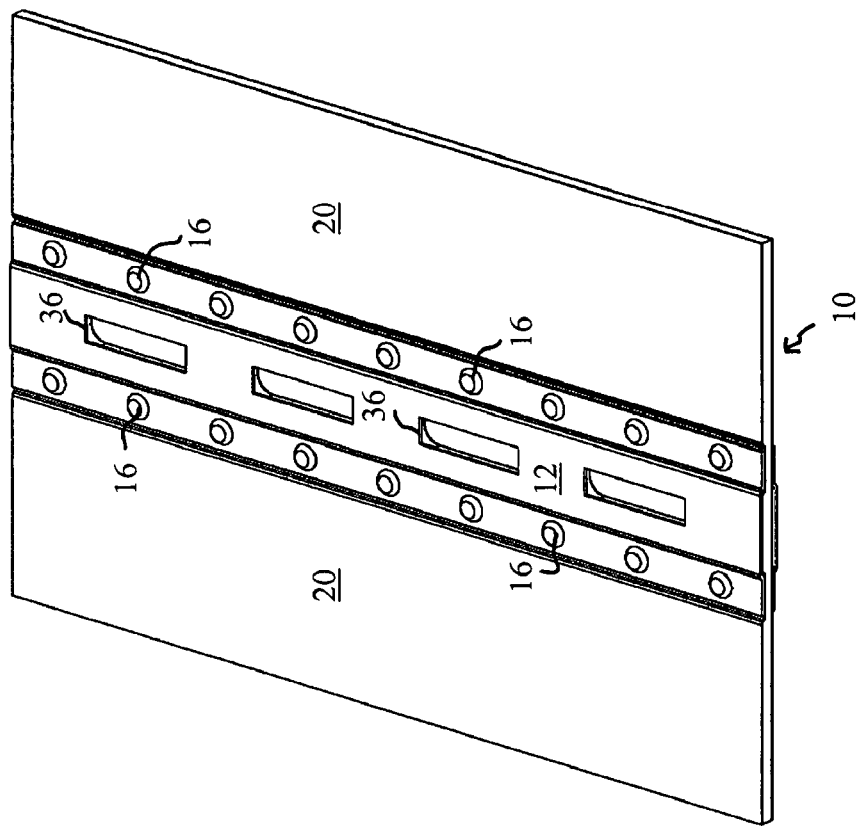
FIG. 6 is a perspective view of a portion of a composite panel sidewall of the present invention viewed from the exterior of the container.

As shown in FIG. 4, the lateral wings 22 of the interior post 12 seat in the recessed grooves 26 of the panel 10. The interior post 12 includes post logistics slots 36 and holes 39 that align with the panel logistics slots 31 and the holes 38 in the panel 10 when the interior post is seated in the grooves. FIG. 5 shows an interior view and FIG. 6 shows an exterior view of the trailer sidewall with the interior post 12 and the exterior post 14 attached to the panel 10 with the rivets 16.

The logistics slots created as described herein may be used to secure cargo within the container. As is well known in the art, logistics posts or other devices may be attached to the logistics slots to provide supports or separation means within the trailer. By providing additional logistics slots at locations other than at the edges of the composite panels, additional locations for securing and dividing cargo are created, thereby increasing the versatility and utility of the trailer.

As shown in FIGS. 1 and 5, the composite panel sidewall of the present invention provides a smooth surface for the interior of the trailer. Because they are seated within the recessed grooves 26, the lateral wings 22 of the interior post 12 do not protrude beyond the inner skin 20 of the panels 10, and thus do not create a snag point for a vehicle or cargo to catch if it is being moved along the inner wall of the trailer. Also, although the interior surface of the midsection 24 of the interior post 12 extends slightly above the plane of the interior surface of the panels 10, a smooth transition is provided from the lateral wings 22 to the midsection 24 of the post. In addition, the midsection 24 of the interior post 12 is supported by the panel 10, protecting the interior post 12 from being deformed or damaged if it is struck by a vehicle or cargo when the trailer is loaded and unloaded.

The recessed grooves 26 allow the interior post 12 to seat in the composite panel 10, thus reducing the thickness of the trailer sidewall and increasing the interior width of the trailer. In addition, the use of an interior post with a non-linear cross-section provides increased rigidity for the post as compared to a comparable flat plate of the same weight and material.

The exterior post 14 seals the logistics slots from the exterior of the trailer. The exterior post 14 is preferably formed with the same cross section as the interior post 12. Because the midsection 30 is offset from the lateral wings 28 of the exterior post 14, additional space between the interior post 12 and the exterior post 14 is provided for the placement of logistics posts in the logistics slots 36. Also, an exterior post having a non-linear cross section provides additional strength and rigidity for the joint between the panels. However, if space for logistics posts is not required, a flat plate may be used on the exterior of the trailer, as noted above. Alternatively, to further reduce the thickness of the trailer sidewall, recessed grooves may also be provided on the exterior of the composite panels, allowing the exterior posts to be seated in these exterior grooves.

Moreover, the interior and exterior posts of the present invention share a common cross section with the posts described in the applicants' U.S. patent application Ser. No. 11/210,076 filed Aug. 23, 2005. As disclosed therein, these common posts may also be used to join the composite panels at their edges. Thus, the same posts may be used for joining the panels and for creating additional logistics slots in the panels set apart from the edges of the panel, thus reducing manufacturing costs by creating common and versatile components for the manufacture of trailer sidewalls.

The inventors contemplate several alterations and improvements to the disclosed invention. For example, the interior and/or exterior posts may be modified to further increase their strength and rigidity. Other alterations, variations, and combinations are possible that fall within the scope of the present invention. Although the preferred embodiment of the present invention has been described, those skilled in the art will recognize other modifications that may be made that would nonetheless fall within the scope of the present invention. Therefore, the present invention should not be limited to the apparatus and method described. Instead, the scope of the present invention should be consistent with the invention claimed below.

What is claimed is:

1. A container having an interior for the storage and transport of cargo, the container having a sidewall construction comprising:
   a plurality of vertically oriented panels, the panels having an interior side, an exterior side, a top edge, a bottom edge, a first vertical side edge and a second vertical side edge;
   at least one of the panels further having a first vertical recessed groove on the interior side of the panel, the first vertical recessed groove running parallel to, but spaced apart from, the first vertical side edge and the second vertical side edge;
   the panel further having a plurality of slots spaced apart from the first vertical side edge and that second vertical side edge;
   an interior vertical member seated in the first vertical recessed groove and having a plurality of apertures that align with the plurality of slots in the panel;
   a plurality of metal rivets extending through the interior vertical member, the exterior side, and the interior side of the panel; and
   wherein the panels are composite panels comprised of an inner core material and outer metal skins covering the inner core material.

2. The container of claim 1 wherein the plurality of slots are located in the first vertical recessed groove.

3. A container having an interior for the storage and transport of cargo, the container having a sidewall construction comprising:
   a plurality of vertically oriented panels, the panels having an interior side, an exterior side, a top edge, a bottom edge, a first vertical side edge and a second vertical side edge;
   at least one of the panels further having a first vertical recessed groove on the interior side of the panel, the first vertical recessed groove running parallel to, but spaced apart from, the first vertical side edge and the second vertical side edge;
   the panel further having a plurality of slots spaced apart from the first vertical side edge and that second vertical side edge;
   an interior vertical member seated in the first vertical recessed groove and having a plurality of apertures that align with the plurality of slots in the panel;
   a second vertical recessed groove on the interior side of the panel, the second vertical recessed groove running parallel to, but spaced apart from, the first vertical side edge and the second vertical side edge;
   the plurality of slots being located between and distant from both the first vertical recessed groove and the second vertical recessed groove; and
   wherein each of the slots fully extends from the interior side to the exterior side of the panel.

4. The container of claim 3 wherein
   the first vertical recessed groove has a depth of a first distance;
   the interior vertical member is a post having a first lateral wing and a second lateral wing lying on a common plane and a midsection connecting the lateral wings, each lateral wing having a interior face separated from an exterior face by substantially the first distance, each face oriented substantially parallel to the interior side of the panel; and
   the first lateral wing seating in the first vertical recessed groove and the second lateral wing seating in the second vertical recessed groove.

5. The container of claim 4, the container further including an exterior vertical member connected to the interior vertical member with a fastener extending through the panel.

6. The container of claim 1 wherein the first vertical recessed groove is spaced apart from the first vertical side edge at least twelve inches and spaced apart from the second vertical side edge at least twelve inches.

7. The container of claim 3 wherein the first and second vertical recessed grooves are spaced apart from the first vertical side edge at least twelve inches and spaced apart from the second vertical side edge at least twelve inches.

8. The container of claim 3 wherein the panels are composite panels comprised of an inner core material and outer metal skins covering the inner core material.

9. The container of claim 4 wherein the panels are composite panels comprised of an inner core material and outer metal skins covering the inner core material.

10. The container of claim 4 wherein the interior faces of the first and second lateral wings are substantially co-planar with the interior side of the panel.

11. The container of claim 10 wherein
    the midsection has an exterior face extending from the first recessed groove to the second recessed groove, wherein substantially all of the exterior face of the midsection contacts the interior side of the panel.

12. The container of claim 5 wherein the exterior vertical member is a post.

13. A container having an interior for the storage and transport of cargo, the container having a sidewall construction comprising:
    a plurality of vertically oriented panels, the panels having an interior side, an exterior side, a top edge, a bottom edge, a first vertical side edge and a second vertical side edge;

at least one of the panels further having a first vertical recessed groove on the interior side of the panel, the first vertical recessed groove running parallel to, but spaced apart from, the first vertical side edge and the second vertical side edge;

the panel further having a plurality of slots spaced apart from the first vertical side edge and that second vertical side edge;

an interior vertical member seated in the first vertical recessed groove and having a plurality of apertures that align with the plurality of slots in the panel;

an exterior vertical member connected to the interior vertical member with a fastener extending through the panel;

the fastener is a rivet extending through the interior member, the interior side of the panel, the exterior side of the panel, and the exterior member.

* * * * *